United States Patent Office 3,248,439
Patented Apr. 26, 1966

3,248,439
PROCESS FOR THE PREPARATION OF TRICYCLO
[3.3.2.0⁴,⁶]DECA-2,7,9-TRIENE
Claude H. Moussebois and Gerhard F. Schröder, Brussels,
Belgium, assignors to Union Carbide Corporation, a
corporation of New York
No Drawing. Filed Sept. 15, 1964, Ser. No. 396,711
5 Claims. (Cl. 260—666)

This invention relates to a novel process for the preparation of a polycyclic hydrocarbon. In one aspect, this invention relates to a novel process for the preparation of tricyclo[3.3.2.0⁴,⁶]deca-2,7,9-triene from a readily available starting material.

In a recent article by W. Von E. Doering and W. R. Roth, Angew. Chem. 75, 27 (1963); Angew. Chem., Internat. Edit. 2, 122 (1963); and tetrahedron 19, 715 (1963), directed to the Cope rearrangement of various diens and trienes, the composition tricyclo[3.3.2.0⁴,⁶]deca-2,7,9-triene was proposed as a hypothetical and a uniquely interesting molecule. It was theorized that if the Cope rearrangement operates for the proposed structure, the individual carbon atoms must circulate freely about the structure independent of each other. However, no method was proposed or suggested for the synthesis of this compound.

Recently, a method has been discovered by G. F. Schröder for the preparation of tricyclo[3.3.2.0⁴,⁶]deca-2,7,9-triene as reported in Angewante Chemie, International Edition in English, volume 2, 1963, No. 8, pages 481–482. In accordance with this process tricyclo [3.3.2.0⁴,⁶]deca-2,7,9-triene can be prepared by a two-step process involving the dimerization of cyclooctatetraene and subsequent cleavage of the dimer to the polycyclic triene. In the first step of the instant novel process dimeric cyclooctatetraene (II) is formed from cyclooctatetraene (I) in accordance with the following equation:

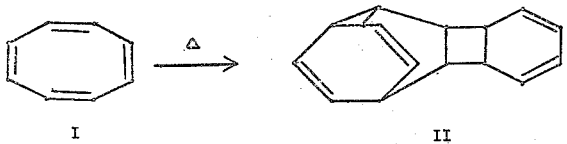

I                      II thereafter, the dimeric product is cleaved across the cyclobutyl nucleus by exposure to radiation to give tricyclo [3.3.2.0⁴,⁶]deca-2,7,9-triene (III) and benzene.

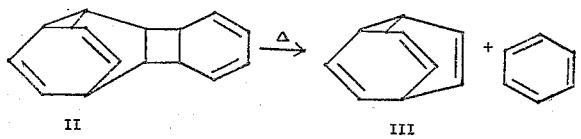

II                      III

Infrared and nuclear magnetic resonance analysis of both the dimer and tricyclo[3.3.2.0⁴,⁶]deca-2,7,9-triene verified that the compositions had the assigned structure. Cleavage of the cyclobutyl nucleus of the dimeric cyclooctatetraene to form tricyclo[3.3.2.0⁴,⁶]deca-2,7,9-triene and benzene as a by-product is conveniently effected by exposing the dimer to a radiation source having wavelength shorter than 7000 angstroms such as X-rays, ultraviolet light, and the like.

The dimeric cyclooctatetraene employed in the preparation of tricyclo[3.3.2.0⁴,⁶]deca-2,7,9-triene is a particularly unstable compound at elevated temperatures. For example, when the dimer is heated for one hour at 80°–100° C., it decomposes to give a variety of monomeric and polymeric substances. When heated rapidly to high temperatures, e.g., 450° C. the infrared and ultraviolet spectra indicated that the dimer was transformed irreversibly to a different dimer having a molecular weight of 208 and an empirical formula of $C_{16}H_{16}$. Although the dimer can be decomposed photochemically in a selective manner to give tricyclo[3.3.2.0⁴,⁶]deca-2,7,9-triene, as previously indicated, a pyrolysis process for preparing the tricyclic compound has also been investigated.

Accordingly, one or more of the following objects will be achieved by the practice of the instant invention. It is an object of this invention to provide a novel process for the preparation of a highly unique and interesting molecule. Another object of this invention is to provide a novel synthetic route to tricyclo[3.3.2.0⁴,⁶]deca-2,7,9-triene. A further object is to provide a novel process for the preparation of tricyclo[3.3.2.0⁴,⁶]deca-2,7,9-triene from a readily available starting material. A still further object of this invention is to provide a novel process wherein the product is obtained in relative high yields by pyrolysis in the dimer of cyclooctatetraene. These and other objects will readily become apparent to those skilled in the art in the light of the teachings herein set forth.

In its broad aspect, the present invention relates to a novel process for the preparation of tricyclo[3.3.2.0⁴,⁶] deca-2,7,9-triene. The process comprises contacting the dimer of cyclooctatetraene with a pyrolysis catalyst at a temperature of from about 250° to about 450° C. and for a period of time to effect optimum conversion to the desired product. The instant process provides a unique and rapid method for the preparation of tricyclo [3.3.2.0⁴,⁶]deca-2,7,9-triene of a relatively high degree of purity.

It has been found that in order to obtain suitable yields of the desired tricyclo compound by pyrolysis of the cyclooctatetraene dimer, the reaction must be conducted in the presence of a pyrolysis catalyst.

By the term "pyrolysis catalyst" is meant those catalysts normally employed in the pyrolysis of hydrocarbons to cleave carbon to carbon bonds and which do not adversely affect either the reactants or the reaction products. Suitable pyrolysis catalysts which can be employed in the process of the present invention include, among others, iron, nickel, chromium, platinum, palladium, tungsten, silicon, aluminum oxide, carbon black, and the like. Additionally, compounds containing the aforementioned metals, for example, ferric oxide, ferrous oxide and the like.

The concentration of the catalyst employed in the instant invention is not necessarily critical and all that is needed is an amount sufficient to effect the desired conversion. However, due to the thermal instability of the reactants and reaction products a relatively short contact time is highly desirable and hence, a large excess of catalysts is usually employed. It is also preferred that the catalyst be in a finely divided state so as to provide the greatest surface area for contact with the dimer. Depending upon the particular method, the catalyst can be employed in a variety of ways. For example, it may be used as a finely divided powder, in fibrous form, or supported on an inert carrier.

As hereinbefore indicated the conversion of the cyclooctatetraene dimer to tricyclo[3.3.2.0⁴,⁶]deca-2,7,9-triene is effected by a pyrolysis of the dimer at a temperature of from about 250° to about 450° C., and more preferably from about 350° to about 425° C. Temperatures above 450° C. are undesirable inasmuch as rapid decomposition of the desired reaction product occurs.

The contact time necessary to effect pyrolysis of the cyclooctatetraene dimer to tricyclo[3.3.2.0⁴,⁶]deca-2,7,9-triene, need only be of such duration to insure optimum conversion of the dimer with a minimum decomposition of the desired product. Reaction times of from a fraction of a second to several seconds are thoroughly practicable. Shorter or longer periods can also feasibly be employed depending upon the temperature (higher temperatures usually permit the use of shorter reaction times) and the manner in which the process is conducted.

Generally, it is desired to conduct the reaction in a stream of an inert gas to insure rapid removal of the reaction products from the pyrolysis zone and to avoid oxidation of the reactants and reaction products. Suitable gases which can be employed include among others, nitrogen, argon, and the like.

The process of the present invention is applicable to both batch and continuous type operations. For instance, the process can be conducted in a continuous manner by means of a tubular reactor containing the catalyst in a heated reaction zone. When operating a continuous process, the dimer in a finely divided form can be passed into one end of the reaction zone where contact is made with the catalyst, and the reaction products immediately withdrawn from the other end of the zone and quickly condensed. Recovery of the desired tricyclo[3.3.2.0$^{4,6}$]deca-2,7,9-triene from unreacted material and byproducts can then be effected. If desired, the unreacted dimer can be recycled to the reaction zone for pyrolysis.

The dimerized cyclooctatetraene starting material is most conveniently prepared by merely heating cyclooctatetraene to temperatures up to about 125° C. for a period of time sufficient to form optimum yields of the dimer. Temperatures above 125° C., while operable, are less preferred due to the further dimerization which result in tetramers and higher molecular weight products. Although cyclooctatetraene slowly dimerizes at room temperature, for economic considerations temperatures of from 25° to 125° C., and more preferably 90° to 110° C., are employed. In practice, it has been found that optimum yields of the dimer are obtained when heating is effected at 100° C. over a period of about 70 hours. However, temperatures and periods above and below the aforesaid ranges can equally as well be employed but are less preferred. While the dimerization step can be conducted in air, it is preferred to operate under an inert atmosphere such as nitrogen, argon and the like.

Separation of unreacted cyclooctatetraene from the dimer can be conveniently effected by distillation at reduced pressures. Thereafter the dimeric cyclooctatetraene can be purified by recrystallization from suitable solvents such as ethanol and the like. The dimer of structure II has a melting point of 75°–76° C.

As hereinbefore indicated, the tricyclo[3.3.2.0$^{4,6}$]deca-2,7,9-triene obtained by the novel process of this invention is a particularly attractive hydrocarbon composition and is characterized by unique and unprecedented properties. As theorized in the aforementioned Doering and Roth article and confirmed by nuclear magnetic resonance studies of tricyclo[3.3.2.0$^{4,6}$]deca-2,7,9-triene itself, no two carbon atoms of the compound remain bonded to each other, and all ten carbon atoms wander over the surface of a sphere in an ever changing relationship to each other. This rapid and reversible valence isomerization characterizes this unique composition of matter in the words of Doering and Roth as the molecule with the ideal "fluxional structure" and provides a variety of interesting properties and commercially attractive uses in agricultural, pharmaceutical, and like applications.

The composition itself, tricyclo[3.3.2.0$^{4,6}$]deca-2,7,9-triene, is a high melting compound which is thermally stable at temperatures as high as 350° C. However, it has been discovered that at temperatures above 450° C. it decomposes to provide a relatively pure form of naphthalene. Moreover, the polycyclic composition, like naphthalene, also undergoes a gradual sublimation at room temperature and is useful as a substitute for camphor, naphthalene, and the like, in such applications as, for example, the storage of woolen and other garments as a melting point depressant, and the like. Of particular interest, is the use of tricyclo[3.3.2.0$^{4,6}$]deca-2,7,9-triene in agricultural applications. For example, this compound has been found to be useful as an active toxicant in agricultural formulations and can conveniently be employed with an inert solid or liquid carrier, such as attapulgite or acetone respectively. Additionally, the composition being unsaturated can be utilized as a reactive intermediate to produce numerous chemical derivatives.

The following examples are illustrative.

EXAMPLE 1

Synthesis of the cyclooctatetraene dimer 217 grams of freshly distilled cyclooctatetraene contained in a flask were heated in an oil bath to 100° C. over a period of 68 hours under oxygen-free conditions. Thereafter unreacted cyclooctatetraene was distilled off at a pressure approximately 1 millimeter of mercury. At the end of the distillation the oil bath temperature was raised to about 60° C. and the pressure reduced to 0.1 millimeter of mercury. There remained in the flask 62 grams of a yellow and viscous oil which was then dissolved in 25 milliliters of ether. This solution was maintained for 24 hours at a temperature of from 0° C. to −5° C. During this time 22 grams of the dimeric cyclooctatetraene crystallized. The crude dimer was recrystallized three times from ethanol to give 18 grams of the dimer having a melting point of 75 to 76° C. Infrared analysis and temperature dependent nuclear magnetic resonance spectra confirm the assigned structure.

EXAMPLE 2

Pyrolysis of the cyclooctatetraene dimer

Solid cyclooctatetraene dimer, in a finely powdered form, was introduced at room temperature into a tubular reactor containing a catalyst zone consisting of iron wool. The catalyst zone was approximately 1 centimeter thick and was maintained at 420° C. As the reaction products were formed, they were quickly withdrawn by means of a high vacuum (0.01 millimeter of mercury) and condensed in a cold trap. Upon analysis the reaction product was found to consist of 3.5 percent of tricyclo[3.3.2.0$^{4,6}$]deca-2,7,9-triene, 30.5 percent of a compound having a molecular weight of 208 and an empirical formula of $C_{16}H_{16}$, and 66 percent of the unchanged dimer.

EXAMPLE 3

Pyrolysis of the cyclooctatetraene dimer

In a manner similar to that employed in the previous example, solid cyclooctatetraene dimer was introduced into the reactor in a finely powdered form. The catalyst zone was maintained at 420° C., and the reaction products withdrawn at a pressure of 10 millimeters of mercury using a nitrogen stream. Analysis of the reaction mixture indicated its composition to be 1.2 percent of tricyclo [3.3.2.0$^{4,6}$]deca-2,7,9-triene, 16 percent of the compound having a molecular weight of 208 and an empirical formula of $C_{16}H_{16}$, and 83 percent of the unchanged dimer.

EXAMPLE 4

Pyrolysis of the cyclooctatetraene dimer

Solid cyclooctatetraene dimer, in a finely powdered form, was introduced at room temperature into a tubular reactor containing a catalyst zone consisting of ferric oxide. The catalyst zone was approximately 2 millimeters thick and was maintained at 360° C. As the reaction products were formed, they were quickly withdrawn by means of a high vacuum (0.1 millimeter of mercury) and condensed in a cold trap. Upon analysis the reaction product after one pass was found to consist of 10 percent of tricyclo[3.3.2.0$^{4,6}$]deca-2,7,9-triene, and 75 percent of the unchanged dimer, and the remainder a compound having a molecular weight of 208 and an empirical formula of $C_{16}H_{16}$.

Although the invention has been illustrated by the preceding examples, the invention is not to be construed as limited to the materials or conditions employed herein, but rather the invention encompasses the generic area as hereinbefore disclosed. Various modifications and embodiments of this invention can be made without departing from the spirit and scope thereof.

What is claimed is:

1. A process for the preparation of tricyclo[3.3.2.0$^{4,6}$]deca-2,7,9-triene which comprises contacting the dimer of cyclooctatetraene of the formula:

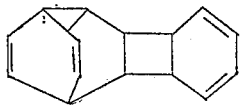

with a pyrolysis catalyst at a temperature of from about 250° to about 450° C.

2. A process for the preparation of tricyclo[3.3.2.0$^{4,6}$]deca-2,7,9-triene which comprises contacting the dimer of cyclooctatetraene of the formula:

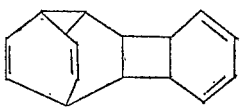

with an iron-containing pyrolysis catalyst at a temperature of from about 250° to about 450° C.

3. A process for the preparation of tricyclo[3.3.2.0$^{4,6}$]deca-2,7,9-triene which comprises contacting the dimer of cyclooctatetraene of the formula:

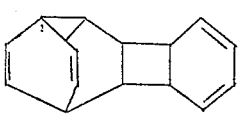

with finely divided iron at a temperature of from about 250° to about 450° C.

4. A process for the preparation of tricyclo[3.3.2.0$^{4,6}$]deca-2,7,9-triene which comprises contacting solid, finely divided cyclooctatetraene dimer of the formula:

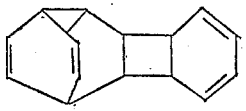

with a pyrolysis catalyst in a reaction zone maintained at a temperature of from about 250° to about 450° C.

5. A process for the preparation of tricyclo[3.3.2.0$^{4,6}$]deca-2,7,9-triene which comprises contacting solid, finely divided cyclooctatetraene dimer of the formula:

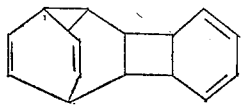

with a pyrolysis catalyst in a reaction zone maintained at a temperature of from about 250° to about 450° C., removing and condensing reaction products, and thereafter recovering tricyclo[3.3.2.0$^{4,6}$]deca-2,7,9-triene.

References Cited by the Examiner

Gerhard Schröder: Angew. Chem. 75, p. 722, 1963.

DELBERT E. GANTZ, *Primary Examiner.*

V. O'KEEFE, *Assistant Examiner.*